Aug. 19, 1969   G. C. HARRISON   3,461,844
LAMINATE ANIMAL STALL FLOORING
Filed July 20, 1967
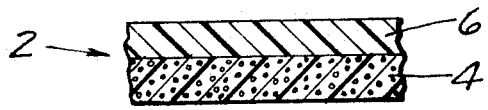
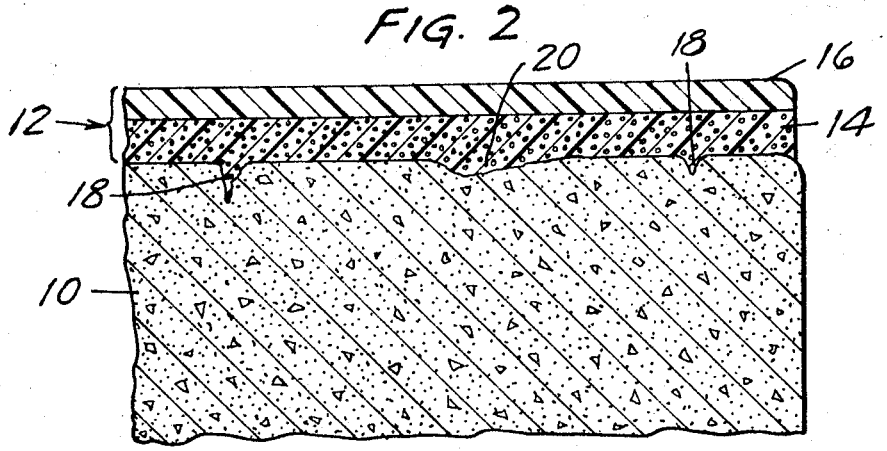
INVENTOR.
GEORGE C. HARRISON
BY
Carpenter, Kinney & Coulter
ATTORNEYS

3,461,844
LAMINATE ANIMAL STALL FLOORING

George C. Harrison, Roseville, Minn., assignor to Minnesota Mining and Manufacturing Company, St. Paul, Minn., a corporation of Delaware
Filed July 20, 1967, Ser. No. 654,926
Int. Cl. A01k 1/00; E04f 15/10; B32b 5/20
U.S. Cl. 119—28                                       8 Claims

ABSTRACT OF THE DISCLOSURE

Polymeric laminates consisting of a hard polymer layer preferably a polyurethane containing a lightweight filler such as glass microbubbles and a rubbery polyurethane layer, the layers being self-adhered to each other by polymerization in situ of the rubbery layer in contact with the hard layer, and more particularly improved mats for animal stalls formed by curing the hard layer in situ on the flooring substrate, and subsequently applying and curing in situ the rubbery layer, thus forming a surfacing under which unsanitary materials cannot accumulate.

---

This invention relates to polymeric laminates and to poured and cured in situ flooring employing such laminates specially adapted for use in animal housing areas, and more particularly to improved cow mats.

The traditional bedding material for dairy cows has been straw. However, the amount of feed grains, such as oats, which result in the production of straw as a by-product, raised on dairy farms has been reduced, as the amount of effort and equipment required for planting and harvesting the crops has become uneconomic. The purchase of straw constitutes objectionable overhead to the farmer, besides requiring constant distribution and removal of the bedding material.

As a replacement for the traditional straw bedding, rubber mats for the cow stalls or other bedding areas have come into wide usage. These mats are cut to shape and bolted or otherwise secured to the cow stall floor. Such mats are relatively expensive and subject to tearing by virtue of the great stresses placed thereon by the animals' hooves and the resulting stresses around the bolt areas. Moreover, a mixture of food, water, urine, and manure, invariably become accumulated under the mat where it undergoes anaerobic decomposition, resulting in a very unsanitary condition and highly objectionable odor. Due to the great amount of work required to remove these mats and to clean the bottom side, there is a great tendency to permit the accumulation to build up without adequate cleaning.

Rubbery poured and cured in situ paving materials, particularly formed polyurethane materials, have been used as a surfacing material for both indoor and outdoor use. See, for example, Buckholtz et al. U.S. Patent 3,272,098, issued Sept. 13, 1966. When such surfacing is used on a cow stall, however, there is a great tendency for the material at the rear edge of the stall to be loosened from the substrate, usually concrete, and to be broken away in smaller pieces by the stresses imposed by the cows' hooves. Thus, such materials have proven too short-lived for economic use in this application.

It is an object of this invention to provide an improved poured and cured in situ cow mat which overcomes the deficiencies of the prior art. The mats of this invention are firmly bonded to the flooring substrate, can be used to even out irregularities in the floor, provide thermal insulation, thus improving the comfort and health of the animals, and are highly resistant to delamination from the substrate or breaking away of the material at the edges. The mats of this invention can rapidly be formed in place without the need for elaborate equipment, and are cured sufficiently within a short period to permit the use thereof on the day of installation. When properly sloped for drainage, the mats of this invention substantially eliminate the need for additional bedding such as a small amount of straw, even in the rear of the stall. Since the mast of this invention are self-adhered to the subfloor, it is virtually impossible for any material to accumulate beneath the mat.

In addition to having an initial cost no greater than, and generally less than, conventional rubber mats, the mats of this invention are substantially longer lived and thus provide economy as compared to previously known bedding materials.

The objectives of this invention are achieved by providing a two-layered poured and cured in situ polymeric, preferably polyurethane, surfacing over a clean flooring substrate. The bottom resin layer, which is generally relatively thick, is formed from a hard, tough, relatively rigid, polymer containing a lightweight filler. The prefererd filler is glass microbubbles of less than about 500 microns in diameter. The top surfacing, poured and cured in situ over the hard underlayer, is a softer elastomeric polyurethane which provides a rubbery, relatively skid-resistant cushioning surface on which the animals stand. The top layer appears to distribute the forces caused by the animals' hooves, thus preventing indentation of the bottom layer and crushing of the hollow filler. Both layers are substantially nonabsorbent, and resilient enough to withstand both the stresses caused by the weight of the animals and those caused by expansion, contraction, or shifting of the floor substrate. The filled underlayer appears to contribute greatly to the ability of the surfacing to withstand the pressures of the animals' hooves, and moreover, it provides great insulative value to the surfacing. Apparently adhesion of the surfacing is promoted by the rigid bottom layer because it has a coefficient of expansion much closer to concrete than does the softer rubbery layer.

In addition to their use as cured in situ surfacing, the two layered polymeric materials of this invention can be poured and cured on a release surface such as a smooth metal or plastic surface or belt, and stripped therefrom. The release surface may be coated with a silicone or other release composition to facilitate stripping of the laminate. Laminates thus formed are useful where it is desired to apply a rubbery surface over a substrate, for example, to provide a shock-absorbing or "bumper" strip. The rigid, microbubble-filled layers provides an anchoring means for applying the rubbery layer to various other substrates. The rigid layer is receptive to mechanical fasteners such as nails, screws, tacks, staples, etc., and therefore the laminate is readily applied to substrates such as metal or wood by simply driving the fastener into the back or rigid part of the laminate. Nails (preferably of the small-headed floor-in type) can also be driven through the entire laminate, as the nail head will penetrate the flexible layer of the laminate, and the rubbery polymer is found to move back together, thus closing the hole caused by the penetration. Thus the location of the fasteners is not visible even though the fastener has been driven directly through both layers.

The invention will be further explained with reference to the drawings wherein:

FIGURE 1 is a cross sectional view of a laminate of this invention, and

FIGURE 2 illustrates an installation of the surfacing of this invention over an animal stall.

As shown in FIGURE 1, laminate 2 is formed from a rigid layer 4 which has flexible layer 6 bonded thereto. As seen in FIGURE 2, substrate 10, which is generally old concrete or the like, is covered with the surfacing 12 of this invention. Surfacing 12 is formed out of underlayer 14 and top layer 16. Underlayer 14 is the bubble-filled hard tough polymeric material further described herein, while layer 16 is a softer rubbery polymer.

As shown in FIGURE 2, underlayer 14 is applied over concrete 10 which has preferably been first thoroughly cleaned. Underlayer 14 is used to fill in cracks 18 and to correct undesired slopes 20 in the substrate. Sufficient of the underlayer material is applied to fill in these irregularities and the same is smoothed on the top surfaces, generally by troweling or the like, to provide a flat surface having the desired slope. Top layer 16 is then applied, preferably to a uniform thickness, directly over the top of underlayer 14.

The substrate to which the surfacing is applied is first cleaned in order to promote good adhesion of the surfacing. In the case of new concrete it is preferred to acid etch the surface, for example with hydrochloric acid, and then steam clean to remove any loose material, particularly any free lime remaining from the concrete mixture. In the case of old concrete, loose material is first removed and the surface is preferably then further steam cleaned. The surface, after steam cleaning, is allowed to dry and is then ready for application of the surfacing.

The bottom resin layer can be applied directly to the clean dry substrate as a pourable or trowelable liquid mixture of resin and microbubble filler. If cracks or large depressions are present in the substrate, it is preferred to first fill them with liquid resin-microbubble mixture of the same composition as the underlayer. The resins from which both top and bottom layers are formed are preferably substantially solvent-free reaction mixtures. The absence of solvents is greatly preferred in order to eliminate the possible fire hazard, and the cost of volatile solvent which would have to be released into the atmosphere. A further problem overcome by the use of substantially solvent-free resins is the great difficulty encountered in drying solvent from castings of the desired thickness. The reaction mixtures must be curable at ambient temperatures from a liquid pourable or trowelable state within a relatively short period of time, preferably less than one day, into a tough resilient polymeric state.

The cured bottom layer should have a Shore D durometer hardness of about 40 to 90, and should contain between 30 and 60 percent by volume, based on the total combined volume of polymer and filler (not including any free air voids within the polymer), of tiny voids, preferably in hollow microbubbles. The bottom layer should also have a unaxial compressive yield strength in accordance with ASTM Test 576–46, Method A, of at least 1000 p.s.i. to provide adequate support for the load generated by animals thereon. The bottom layer should be applied in sufficient quantity to fill the irregularities in the surface and to provide a layer at least about ⅛ inch thick over the highest points on the substrate being covered. The bottom layer contains 30 to 60% by volume of tiny microbubbles 10 to 500 microns in diameter. The microbubbles are preferably formed from glass or a rigid polymer such as an epoxy or ureaformaldehyde resin and have an average true particle density between 0.1 and 0.7. The preferred microbubbles are formed from a stable preformed glass as described in Beck and O'Brien application Ser. No. 304,221, filed Aug. 23, 1963, now Patent No. 3,365,-315. Also useful are alkali silicate glass microbubbles of the type shown in Veatch et al. U.S. Patent No. 2,978,340, issued Apr. 4, 1961. Other lightweight fillers such as particular perlite or the like can also be used, but microbubbles are preferred for uniformity and ease of mixing.

The polymer reaction mixture used must cure to a tough resilient polymeric form which is sufficiently resilient to expand and contract with the substrate and to support the high localized pressures effected by an animal's feet. The polymer should retain its resiliency over a wide range of temperatures, at least 0° to 100° F. In order to provide the necessary stability against water, milk, urine, etc. which may be frequently spilled on the surfacing, the polymer should be one which is hydrolytically stable, i.e., substantially free of readily hydrolyzable groups. The preferred resins are polyalkylene ether based polyurethanes, epoxies, and polyester resins.

The resin mixture of the bottom layer may also contain free air voids, if desired. These air voids should be in the form of tiny air cells thoroughly dispersed throughout the resin, and should not exceed 50% by volume of the total resin-microbubble-air mixture in order to avoid significantly decreasing the strength of the surfacing. In the case of the preferred polyurethane reaction mixtures, air voids can be introduced by adding a few drops of water to the reaction mixture. Such water causes the formation of urea linkages with the attendant evolution of $CO_2$ gas which remains in the resin.

In order to provide room temperature curable reaction mixtures a curative or catalyst for the particular system is selected, as will be appreciated by those skilled in the art. In the case of polyurethane reaction systems soluble organometallic compound catalysts are preferred, particularly compounds of mercury, tin, or lead. In the case of epoxy resin systems, amine or other curvatives which promote room temperature hardening of the resins are used. In the case of polyester resins systems, the polyester resin, styrene (and usually styrene modifier), and a catalyst such as methyl ethyl ketone peroxide, form the reaction mixture.

The resin which forms the top layer should have a Shore $A_2$ durometer hardness of between 30 and 70, and a tensile strength in accordance with ASTM Test D412–62T of at least 1000 p.s.i. The polymer should also have a tear strength in accordance with ASTM Test No. D624–54 of more than about 100 lbs. per lineal inch. The top layer is preferably at least ⅛ inch thick, and preferably about ⅛ to ½ inch. The polymer should provide a skid-free surface; it has been noted that the harder the polymer used, the thicker the top layer must be in order to provide a slip-free footing. Relatively thicker and/or softer layers are also desirable where lighter weight animals, e.g., calves, are primarily intended to use the surfacing.

The preferred resins for forming the top or exposed layer of the surfacing are also polyoxyalkylene polyol based polyurethanes, i.e., the reaction products of such polyols with organic polyisocyanates. It is preferable to add a minor amount, e.g., less than about 10% of an isocyanate-reactive amine to the reaction mixture used for forming the top layer. These polymers are preferred because they are available in readily applicable liquid form, when catalyzed, gel within minutes and are sufficiently cured to permit walking thereon in a few hours at room temperature to a tough solid polymeric state, and are in the hardened state tough, abrasion resistant, and sufficiently stable to withstand either indoor or outdoor exposure.

In the case of polyurethanes, the hardness of the final polymer is controlled by varying the degree of crosslinking, and also to some degree, the urethane linkage density. As will be appreciated by those skilled in the art, this can be most readily accomplished by using polyol components of varying functionality and molecular weight. The use of relatively higher molecular weight glycols, such as 2,000 molecular weight polyoxypropylene glycol, will result in a rubbery resilient polymer. Lower molecular weight polyols, and those having a higher functionality (i.e., a higher number of —OH groups per average molecular weight) will form harder polymers. For forming hard polyurethanes, it is preferred to use a polyol having one —OH group per 130 to 400 atomic weight units of polyol. Examples of suitable polyols include polyalkylene ether polyols; polyesters, such as those formed by addition of carboxylic acids and polyhydric alcohols, condensation of lactones, or castor oil derivatives such as those formed by reaction of castor oil with pentaerythritol, low molecular weight polyols such as pentaerythritol, trimethylol propane, glycerol, etc., or mixtures of various polyols.

Various aromatic, aliphatic, cycloaliphatic, or heterocyclic polyisocyanates or mixtures thereof can be used. Toluene diisocyanate is particularly preferred because of its reactivity, fluidity, and ready availability.

A catalyst is generally required to cause polyurethanes to cure at room temperature. The preferred catalysts are polyol-soluble organic compounds of certain polyvalent metals such as tin, lead, and mercury. Examples of the preferred catalysts include phenylmercuric acetate, phenylmercuric oleate, mercuric octoate, mercuric naphthenate, lead octoate and lead naphthenate.

The invention will be further illustrated by the following examples in which all parts are given by weight unless otherwise indicated.

EXAMPLE I

The following ingredients, designated as "part A," were mixed separately:

|  | Parts |
|---|---|
| Polyoxypropylene triol, 432 molecular weight (TP–440) | 220 |
| Polyoxypropylene triol, 732 molecular weight (TP–740) | 180 |
| Calcium octoate | 0.8 |
| Phenyl mercuric acetate | 0.2 |

The following ingredients, designated as "part B," were separately mixed:

|  | Parts |
|---|---|
| Toluene diisocyanate | 260 |
| Polyoxypropylene triol, 732 molecular weight | 140 |

Parts A and B were mixed together in equal parts by weight, together with 16% by weight of the total mixture of glass microbubbles having a density of 0.35 gram per cc. and an average diameter of 40 microns. The microbubbles had a surface treatment of methacrylate-chromic chloride complex, coupling agent. The mixture was applied directly over clean, dry concrete. The top surface of the polymer was readily smoothed by troweling. The pot life of the reaction mixture was 4 to 10 minutes, depending on the ambient temperature. The layer was ready for application of the top coat in about 6 hours at room temperature. Cure of the polymer can be accelerated by heating the layer, for example by blowing hot air thereover. A piece of the mixture cast and cured separately was tested and found to have a density of 0.65 gram per cc., a Shore D hardness of 62–64 at room temperature, a compressive strength of 1610 p.s.i. at 3% deflection, 3360 at 5% deflection, compressive uniaxial yield strength of (ASTM Test D575–46, Method A, 0.1 millimeter per minute) 4500 p.s.i., a tensile strength of 2300 p.s.i. and 2% elongation at rupture. The top layer of rubbery resin was applied as soon as the hard bottom layer had cured to a nontacky state. A layer ⅛ to¼ inch thick of the top layer was applied by troweling. A greater thickness was applied in the area normally walked on by the animals. The composition of the top layer which was mixed in a ratio of 100 parts of part A to 27 parts of part B is as follows:

Part A

|  | Parts |
|---|---|
| Polyoxypropylene glycol, molecular weight 2000 | 90.7 |
| Litharge | .3 |
| Finely divided silica | 3.0 |
| Methyleneorthochloroaniline | 3.6 |
| Lead 2-ethyl hexoate | .4 |
| Phenylmercuric acetate | .6 |
| Iron oxide pigment and color stabilizer | 1.4 |

Part B

|  |  |
|---|---|
| Toluene diisocyanate | 62.3 |
| Polyoxypropylene glycol (400 molecular weight) | 31.4 |
| Polyoxypropylene triol, 432 molecular weight | 6.3 |

The top layer cures at room temperature to a tack-free state within 30 minutes, and is sufficiently tough on the day of application to withstand immediate use by animals such as cows. A portion of the resin used for the top layer was cast and cured separately at room temperature. The latter when tested, was found to have a Shore $A_2$ durometer hardness of 63 at room temperature, a tensile strength of 1650 p.s.i. when tested in acc ordance with ASTM Test D412–62T, 2 inch per min. pull rate, elongation at rupture of 800%, and a notched tear strength of 200 lb. per lineal inch.

Example II

A polyester resin is substituted for the polyurethane in the base layer. Fifty to 75% by weight of a rigid polyester formulation are mixed with 25 to 50% of a flexible polyester resin. The rigid polyester resin has the following composition:

| | | |
|---|---|---|
| Phthalic anhydride | moles | 1.75 |
| Maleic anhydride | do | 1.0 |
| Propylene glycol | do | [1] 2.75 |
| t-butyl catechol | percent | 0.05 |

[1] Plus 3% excess.

The polyester is reacted to an acid number of approximately 30, and 30 parts by weight of styrene are added to 70 parts by weight of this polyester.

The flexible polyester resin has the following formulation:

|  | Moles |
|---|---|
| Adipic acid | 1 |
| Maleic anhydride | 0.1 |
| Propylene glycol | [1] 1.1 |

[1] Plus 3% excess.

This flexible polyester composition is reacted to an acid number of about 28, using 0.1% zinc chloride. An equal amount by weight of styrene is added to the resin while maintaining the same in an inert atmosphere. The flexible and rigid polyesters are mixed together in the above noted ratios and catalyzed with 2 to 3% methyl ethyl ketone peroxide. It is perferred to also use 0.1% cobalt naphthenate accelerator. The glass bubble filler is added to the resin immediately prior to the catalyst.

What is claimed is:

1. A composite polymeric material comprising a rubbery polymeric polyurethane layer having a durometer hardness on the Shore $A_2$ scale of 30 to 70, the tensile strength of at least 1000 p.s.i., and a stiff, resilient anchoring layer having a Shore D durometer hardness of 40 to 90, and a uniaxial compressive yield strength at least 1000 p.s.i., said layer being formed from a relatively stiff resilient polymer which contains 30 to 60% by volume of tiny microbubbles, 10 to 500 microns in diameter, said microbubbles having an average true particle density of 0.1 to 0.7, said anchoring layer containing 0 to 50% of finely divided air voids uniformly distributed therethrough, based on the total volume of said anchoring layer, said polymers having been formed from substantially solvent-free reaction mixtures, said layers being self-adhered to each other by the polymerization of one of said layers in contact with the other of said layers.

2. Material according to claim 1 wherein said first layer is self-adhered to a substrate by having been cured in situ in direct contact with said substrate.

3. An animal stall having a stable delamination resistant polymeric surface comprising a flooring substrate having self-adhered thereto a cured in situ first layer of hard resilient polymeric material having a room temperature Shore D durometer hardness of 40 to 90 and a uniaxial compressive yield strength of at least 1000 p.s.i., said first layer being overcoated with a second cured in situ layer of rubbery polyurethane polymer having a Shore $A_2$ durometer hardness at room temperature of 30 to 70, a tensile strength of at least 1000 p.s.i., and a tear strength in accordance with ASTM Test No. D624–54 of more than about 100 pounds per lineal inch, said layers being self-adhered to each other by the polymerization in situ of said second layer in contact with the first layer, and first layer being self-adhered to said substrate by the polymerization thereof in direct contact with said substrate.

4. Surfacing according to claim 3 wherein said first layer contains 30 to 60% by volume of voids in the form of a light weight filler.

5. Surfacing according to claim 4 wherein said filler consists essentially of rigid microbubbles 10 to 500 microns in diameter.

6. An animal stall having a stable delamination resistant polymeric surface comprising a flooring substrate having self-adhered thereto a cured in situ first layer of hard, resilient, polymeric material containing 30 to 60% by volume of tiny rigid microbubbles 10 to 500 microns in diameter, the microbubbles having an average true particle density of 0.1 to 0.7, said layer having a room temperature Shore D durometer hardness of 40 to 90 and a uniaxial compressive yield strength of at least 1000 p.s.i., said first layer being overcoated with a second cured in situ layer of rubbery polyurethane polymer having a Shore $A_2$ durometer hardness at room temperature of 30 to 70, a tensile strength of at least 1000 p.s.i., and a tear strength in accordance with ASTM Test No. D624–54 of more than about 100 lbs. per lineal inch, said layers being self-adhered to each other by the polymerization in situ of said second layer in contact with said first layer.

7. Surfacing according to claim 6 wherein said first layer comprises a rigid polyurethane polymer containing 0 to 50% of finely divided air voids uniformly distributed therethrough.

8. Surfacing according to claim 6 wherein both of said layers are at least ⅛ inch thick.

References Cited

UNITED STATES PATENTS

| | | | |
|---|---|---|---|
| 2,665,664 | 1/1954 | Benjamin | 119—28 |
| 2,720,861 | 10/1955 | Stroup et al. | 119—28 |
| 2,806,812 | 9/1957 | Merz | 154—78 |
| 2,878,153 | 3/1959 | Hacklander | 264—248 |
| 2,956,281 | 10/1960 | McMillan et al. | 343—872 |
| 3,148,663 | 9/1964 | Conover | 119—16 |
| 3,271,222 | 9/1966 | Moorman | 156—214 |

ALDRICH F. MEDBERY, Primary Examiner

U.S. Cl. X.R.

52—309; 94—19; 156—78